United States Patent [19]
Gilmore et al.

[11] Patent Number: 5,992,461
[45] Date of Patent: Nov. 30, 1999

[54] SOLENOID VALVE HOUSING

[75] Inventors: Paul A. Gilmore, Livonia; Richard L. Dalton, Jr., Howell, both of Mich.

[73] Assignee: Numatics, Incorporated, Highland, Mich.

[21] Appl. No.: 09/135,899

[22] Filed: Aug. 18, 1998

[51] Int. Cl.[6] .................................................. F15B 13/044
[52] U.S. Cl. .............................. 137/625.65; 251/129.21; 335/281
[58] Field of Search ................. 137/625.65; 251/129.21; 335/281

[56] References Cited

U.S. PATENT DOCUMENTS

| | | |
|---|---|---|
| 3,043,336 | 7/1962 | Parent et al. .................... 251/129.21 X |
| 3,377,046 | 4/1968 | Frantz et al. ....................... 251/129.21 |
| 4,102,526 | 7/1978 | Hargraves . |
| 4,322,057 | 3/1982 | Yamanaka et al. ............. 137/625.65 X |
| 4,326,696 | 4/1982 | Ishikawa et al. ............... 137/625.65 X |
| 4,442,864 | 4/1984 | Kosugi et al. .................. 137/625.65 X |
| 4,790,513 | 12/1988 | Davis et al. .................... 137/625.65 X |
| 5,207,245 | 5/1993 | Marazano ............................ 137/635.65 |

FOREIGN PATENT DOCUMENTS 1806040  5/1970  Germany ........................... 251/129.21

*Primary Examiner*—Gerald A. Michalsky
*Attorney, Agent, or Firm*—Rēising, Ethington, Barnes Kisselle, Learman & McCulloch, P.C.

[57] ABSTRACT

A solenoid valve with a ferromagnetic flux frame which, in assembly, locates and retains the components of the solenoid valve without an exterior housing. Preferably, the solenoid valve has an electric coil disposed on a tubular coil bobbin, a plunger received within the bobbin and first and second bodies each having at least one passage with the passages selectively communicated with each other by the plunger. The flux frame preferably has two complementary halves which when mated together interconnect the first and second bodies at opposed ends of the flux frame to retain and locate the parts of the solenoid valve without an overmolded or exterior housing. Preferably, the halves of the flux frame are mated with a snap-fit to facilitate assembly of the solenoid valve.

16 Claims, 3 Drawing Sheets

SOLENOID VALVE HOUSING

FIELD OF THE INVENTION

This invention relates generally to solenoid valves and more particularly to a solenoid valve having an improved construction and arrangement.

BACKGROUND OF THE INVENTION

Solenoid valves are commonly used in a plurality of pneumatic and hydraulic applications. Such solenoid valves typically have a plunger received within a coil which is generally loosely received within a magnetically susceptible cylindrical flux tube, all of which are received within an outer shell or housing. The housing is usually of a molded plastic material and is received over and encapsulates the flux tube and the other solenoid valve components in assembly. Typically, the housing's only function is to locate and retain the components of the solenoid valve. The housing is not necessary for the operation of the solenoid valve and it increases the cost to manufacture and assemble the valve.

SUMMARY OF THE INVENTION

A solenoid valve with a ferromagnetic flux frame which, in assembly, locates and retains each of the components of the solenoid valve without an exterior housing. Preferably, the solenoid valve has a coil disposed on a tubular bobbin, a plunger received within the bobbin and first and second bodies each having at least one passage with the passages selectively communicated with each other by the plunger. The flux frame preferably has two complementary halves which when mated together interconnect the first and second bodies at opposed ends of the flux frame to retain and locate each of the parts of the solenoid valve without an overmolded or exterior housing. Preferably, the halves of the flux frame are mated with a snap-fit to facilitate assembly of the solenoid valve.

Objects, features and advantages of this invention include providing a solenoid valve which has a flux frame which both completes the magnetic path of the solenoid and locates and retains each of the components of the solenoid valve in assembly, eliminates the need for an exterior housing, may be mounted directly to a circuit board which controls the operation of the solenoid, is rugged, durable of relatively simple design and economical manufacture and assembly and has a long useful life in service.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
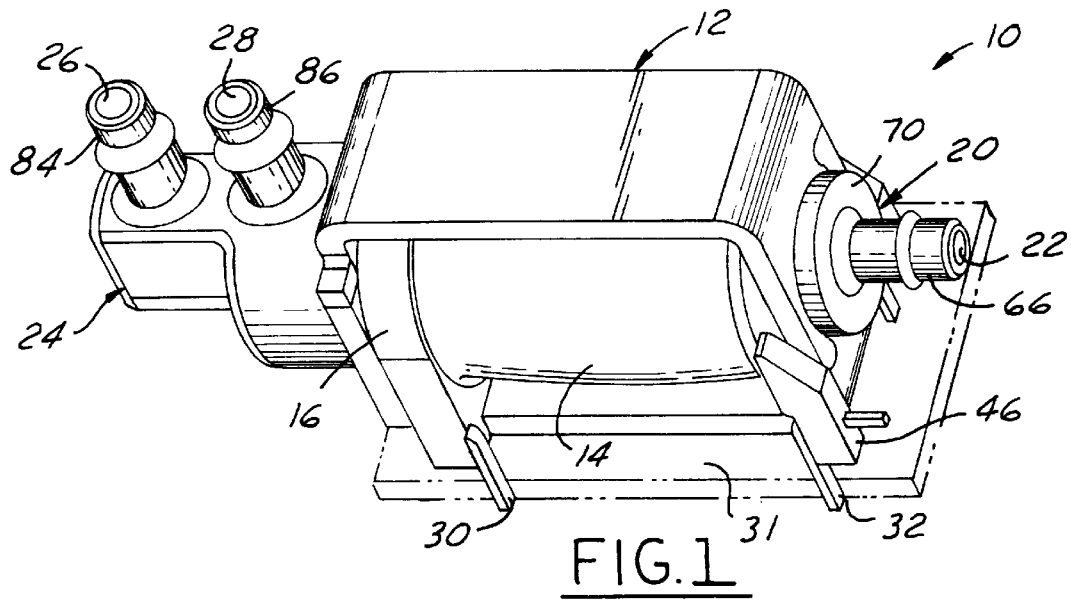
FIG. 1 is a perspective view of a solenoid valve having a flux frame embodying this invention.
Figure 2:
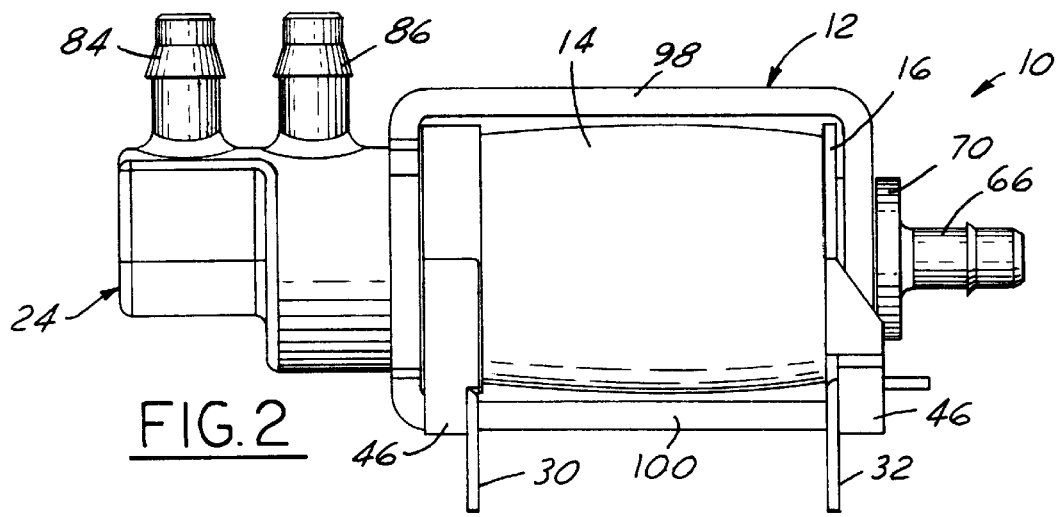
FIG. 2 is a side view of the solenoid valve of FIG. 1.
Figure 3:
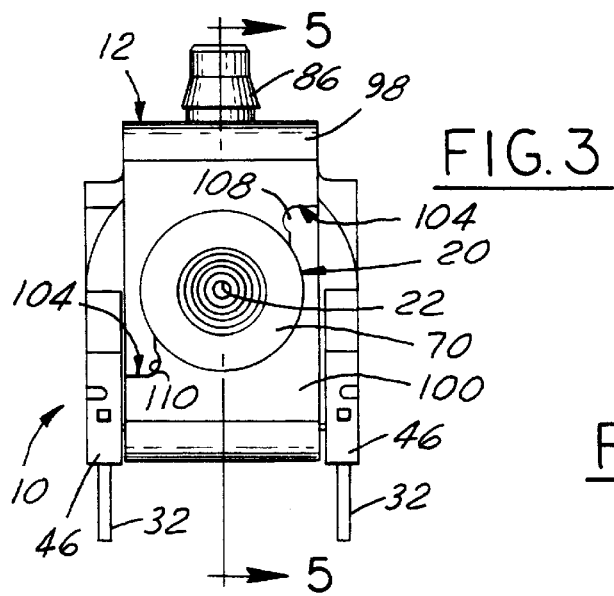
FIG. 3 is a view of one end of the solenoid valve.
Figure 4:
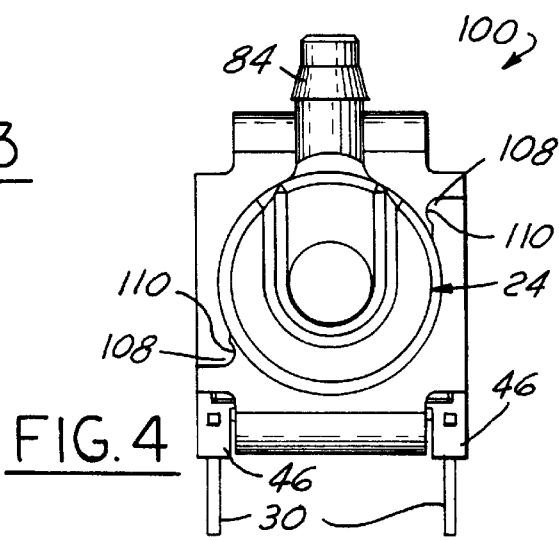
FIG. 4 is a view of the other end of the solenoid valve.
Figure 5:
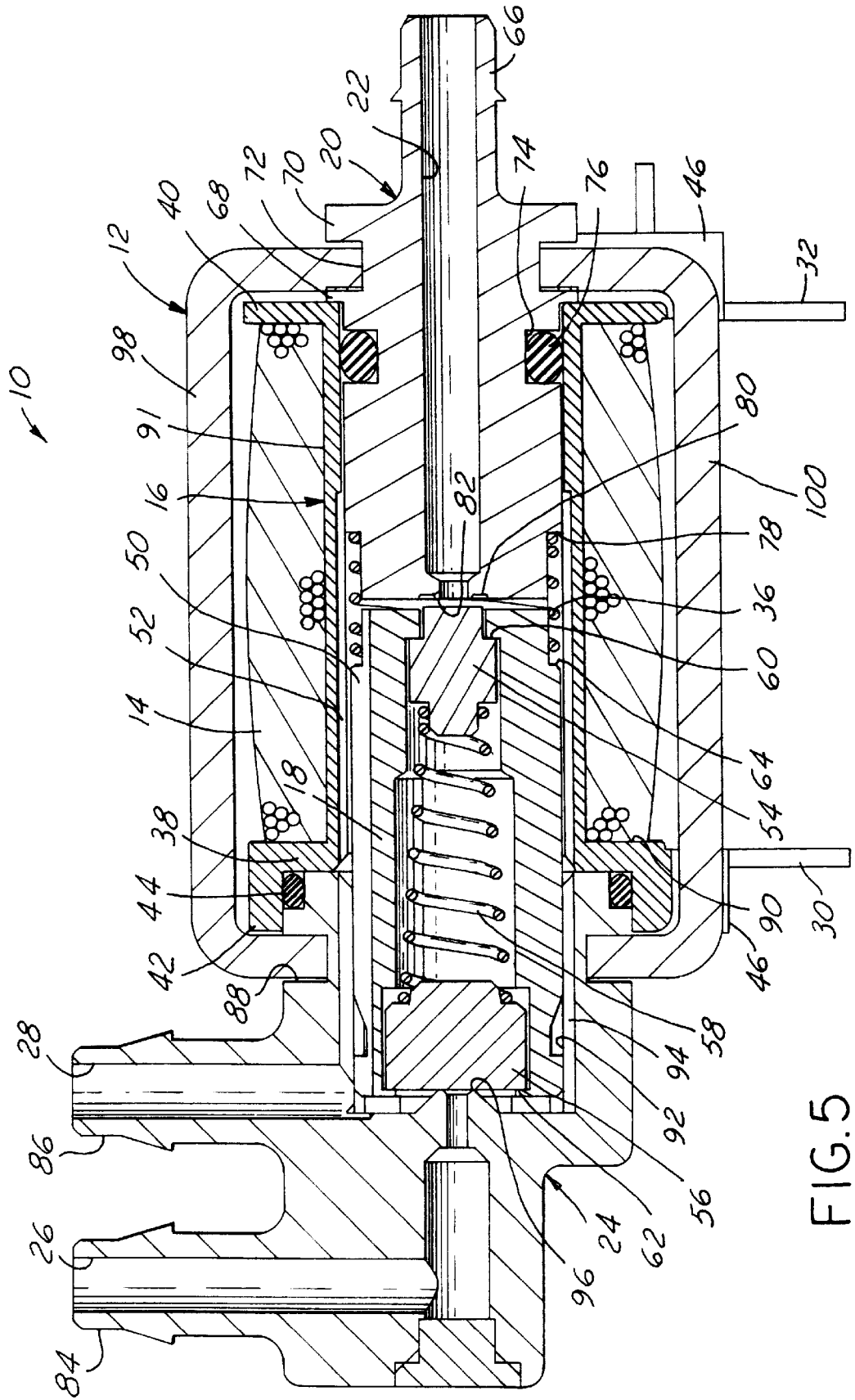
FIG. 5 is a cross sectional view taken along line 5—5 of FIG. 3.

Referring in more detail to the drawings, FIGS. 1–5 illustrate a three-way pneumatic solenoid valve 10 having a flux frame 12 which locates and retains the components of the solenoid valve 10 without an exterior housing. As best shown in FIG. 5, the solenoid valve 10 has a coil 14 of electric wire wrapped around a tubular coil bobbin 16, a plunger 18 received within the bobbin 16, a first body 20 having a first fluid passage 22 therethrough and a second body 24 having second and third fluid passages 26, 28 formed therein with all of the fluid passages 22, 26, 28 selectively communicated with each other by the plunger 18. A pair of solder pins 30 extend from the coil bobbin 16 to electrically connect the coil 14 and directly mount the solenoid valve onto a circuit board 31 (shown in phantom in FIG. 1) which supplies the electrical current which energizes the coil 14. A second pair of solder pins 32 may also extend from the coil bobbin 16 to more securely mount the solenoid valve 10 to the circuit board.

However mounted to the circuit board, an electric current is supplied to the coil 14 through the solder pins 30 to energize the coil 14 and thereby produce a magnetic field. The magnetic field displaces the plunger 18 from a first position closing the second fluid passage 26 to a second position closing the first fluid passage 22 to selectively communicate the first and second passages 22, 26, respectively, with the third fluid passage 28. Preferably, when the solenoid coil 14 is not energized, a spring 36 returns the plunger 18 to its first position. More specifically, when the plunger 18 is in its first position, the first fluid passage 22 communicates with the third fluid passage 28 and the second fluid passage 26 is closed by the plunger 18. When the plunger 18 is in its second position, the second fluid passage 26 communicates with the third fluid passage 28 and the first fluid passage 22 is closed by the plunger 18.

Figure 7:
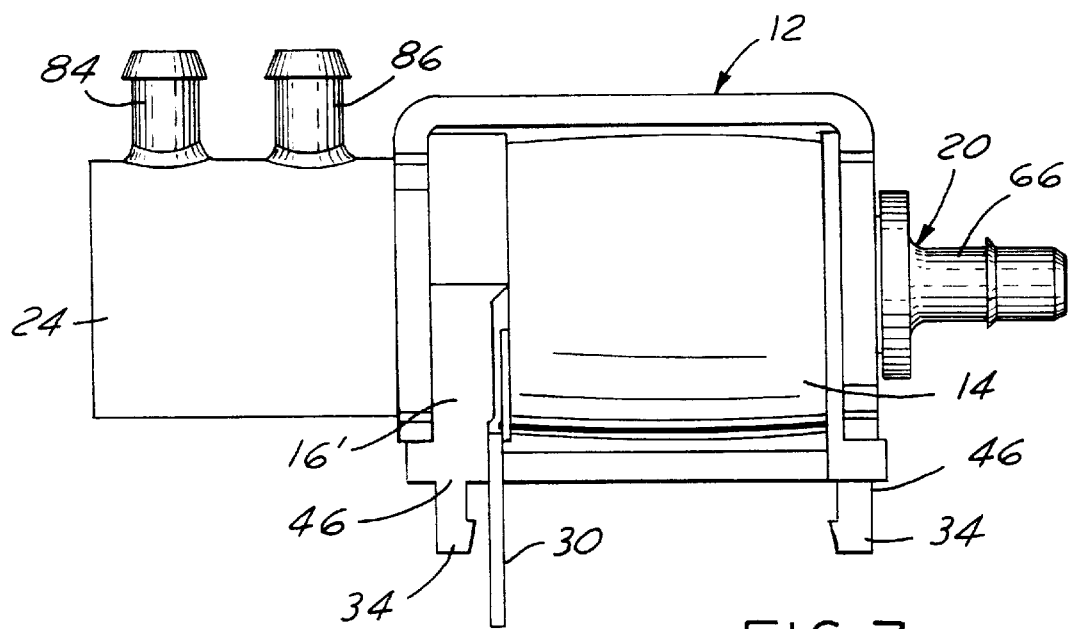
FIG. 7 is a side view of an alternate embodiment of a solenoid valve assembly having feet constructed to be press fit into complementary openings of a circuit board to retain the solenoid valve on the circuit board.

The coil bobbin 16 is annular, axially elongate and has a pair of generally radially outwardly extending flanges 38, 40, one adjacent each end and between which the coil 14 of wire is received. From one flange 38, an axially extending and circumferentially continuous shoulder 42 is received over a portion of the second body 24 with a sealing member, such as an O-ring 44, received between them to prevent leakage of a fluid, such as compressed air from the valve 10. Integral depending legs 46 of the coil bobbin 16 receive the solder pins 30, 32 through openings formed in the legs 46 with one pair of the solder pins 32 being electrically connected to the coil 14 and all of the solder pins 30, 32 securely mounting the solenoid valve 10 directly on the circuit board. Alternatively, as shown in FIG. 7, the legs 46 may terminate in feet 34 constructed to be pressed into complementary holes of the circuit board to mount the solenoid valve 10 on the circuit board. In still other embodiments, it may be desirable to locate the solenoid valve 10 remotely from the circuit board with suitable wires interconnecting the solder pins 32 or coil 14 and the circuit board.

The plunger 18 is formed of a ferromagnetic material, such as steel and is at least partially received in the coil bobbin 16 for reciprocation between its first and second positions as driven by the magnetic field generated by the energized coil 14 and the force of the spring 36. Circumferentially spaced apart slots 50 about the exterior of the plunger 18 provide a fluid flow path between the plunger 18 and the coil bobbin 16 which may also have slots 52 formed in its interior to provide a larger flow path. The plunger 18 is preferably annular and has spaced apart first and second valve heads 54, 56 received therein adjacent opposed ends of the plunger 18. A coil spring 58 disposed between the valve heads 54, 56 yieldably biases the first and second valve heads 54, 56 into engagement with a radially inwardly extending shoulder 60, 62, respectively, of the plunger 18. A reduced diameter end of the plunger 18 provides a shoulder 64 which locates and retains the spring 36 yieldably biasing the plunger 18 towards its first position.

The first body 20 has the first fluid passage 22 coaxially therethrough and is at least partially received in the coil bobbin 16 at one end and has an opposed free end defining a connector portion 66 on which a suitable tube to convey the fluid with which the valve is used may be press fit. A pair of spaced apart radially outwardly extending flanges 68, 70 define a circular and circumferentially continuous recess 72 between them in which a portion of each of the flux frame 12 is received to retain the first body 20. The flange 68 also bears on the coil bobbin 16 in assembly to locate the first body 20 relative to the coil bobbin 16. A groove 74 formed in the periphery of the first body 20 is constructed to receive a sealing member such as an O-ring 76 between the coil bobbin 16 and the first body 20 to prevent leakage from the solenoid valve 10. A reduced diameter end of the first body 20 adjacent the plunger 18 provides a shoulder 78 to locate and retain the other end of the spring 36 which yieldably biases the plunger 18 to its first position. Preferably, a groove 80 is provided encircling one end of the first fluid passage 22 to form an annular valve seat 82 constructed to be engaged by the first valve head 54 of the plunger 18 to prevent fluid flow through the first fluid passage 22. Preferably, the first valve head 54 extends slightly beyond the end of the plunger 18 so that the first valve head 54 engages the valve seat 82 before the plunger 18 engages the first body 20 to insure a sufficient seal between the valve head 54 and the valve seat 82.

The second body 24 has the second and third fluid passages 26, 28 formed therein with both the second and third passages 26, 28 terminating in separate connector portions 84, 86 extending from the second body 24 and on which a suitable tube may be received. A circular and circumferentially continuous groove 88 spaced from one end 90 of the second body 24 receives a portion of the flux frame 12 to locate and retain the second body 24. The end 90 of the second body 24 is preferably received within the axially extending shoulder 42 of the coil bobbin 16 with the O-ring 44 between them as described. The second body 24 preferably has a bore 92 coaxial with and complementary to the sleeve 91 of the coil bobbin 16 in which the plunger 18 is partially received. The second body 24 may have axially extending slots 94 formed in its interior communicating with the slots 52 formed in the coil bobbin 16 to define in part the fluid flow path between the plunger 18 and the second body 24. Preferably, adjacent the second fluid passage 26 a raised annular seat 96 is provided in the second body 24 engageable with the second valve head 56 of the plunger 18 such that the second valve head 56 contacts the valve seat 96 before the plunger 18 contacts the second body 24 to insure a sufficient seal of the second fluid passage 26.

Figure 6:
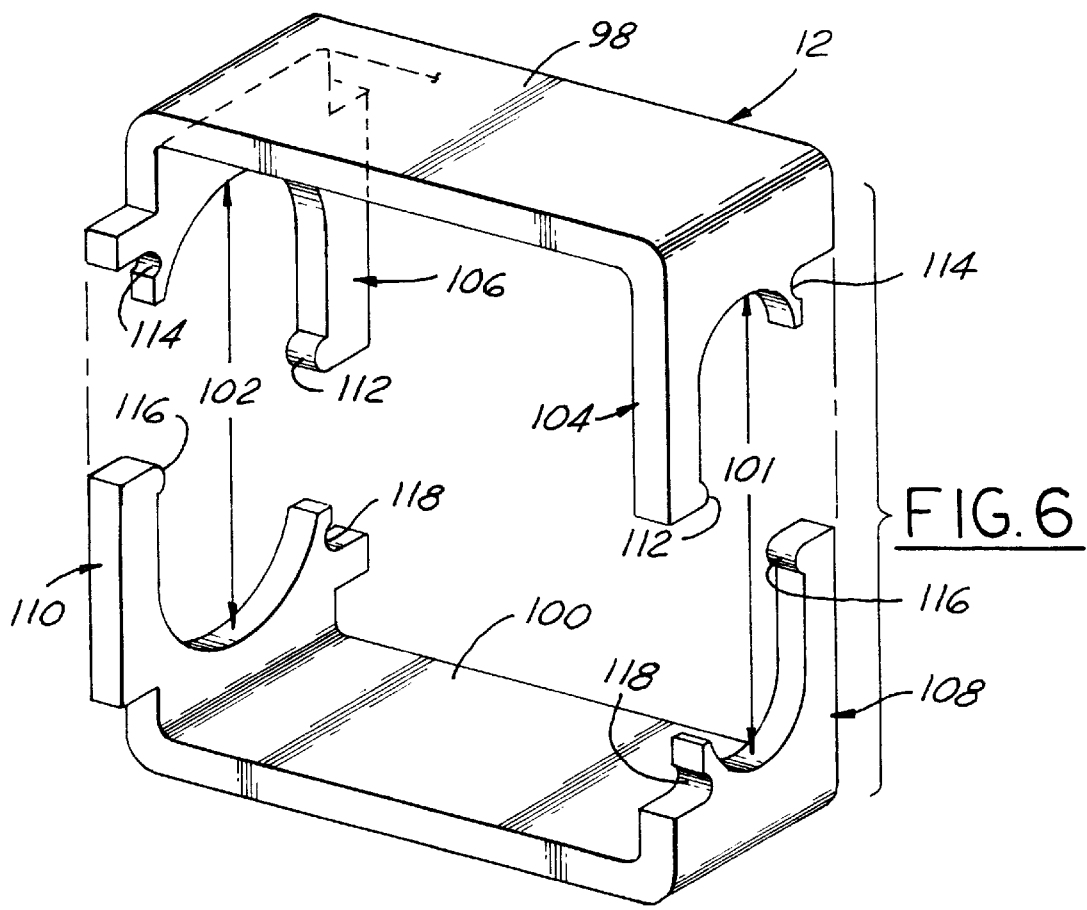
FIG. 6 is a perspective view of a flux frame according to a preferred embodiment of the invention.

The flux frame 12 is formed of a ferromagnetic material, such as steel, to complete the magnetic flux path or circuit of the solenoid valve 10. As shown in FIG. 6, the flux frame 12 preferably has first and second halves 98, 100 which when mated together define circular openings 101, 102 at opposed ends which are generally complementary to the circular recess 72 and groove 88 in the first and second bodies 20, 24, respectively. As shown, each half 98, 100 of the flux frame 12 is generally U-shaped having a pair of free ends 104, 106 and 108, 110, respectively. Each end 104, 106 of one half 98 of the frame 12 has a tang 112 and a groove 114 constructed to receive complementary tangs 116 and grooves 118 of the mating ends 108, 110 of the other half 100 of the flux frame 12 with a snap-fit to hold the halves 98, 100 together and thereby locate and retain each of the components of the solenoid valve 10. Alternatively, the halves 98, 100 of the flux frame may be welded, joined by an adhesive or otherwise connected together in assembly.

The simple design of the flux frame 12 greatly facilitates assembly of the solenoid valve 10 without degrading its operation or performance. As illustrated and described, the flux frame 12 both completes the magnetic flux path of the solenoid valve 10 and locates and retains each of the components of the solenoid valve 10 without the need for an exterior housing which would increase the cost to manufacture and assemble the solenoid valve 10. Further, the circular openings 101, 102 through the flux frame 12 and the complementary circular recess 72 and groove 88 in the first or second bodies 20, 24 permit the bodies to be rotated relative to the flux frame 12 to vary the orientation of any connector portions 66, 84, 86 of the fluid passages 22, 26, 28 as desired for a particular application. The solder pins 30, 32 and/or depending feet 34 of the coil bobbin 16 permit the solenoid valve 10 to be directly mounted to the circuit board to provide a more compact package and arrangement of the solenoid valve 10 and circuit board. Although illustrated and described as a three-way valve, the solenoid valve 10 may be of substantially any configuration. Similarly, the valve 10 is described in relation to a pneumatic application although it may be used in substantially any other application where solenoid valves 10 are suitable to control fluid flow.

What is claimed is:

1. A solenoid valve comprising:

an electric coil which when energized, generates a magnetic field, said electric coil having a central through passage opening at both ends to the exterior of said electric coil;

a first body disposed adjacent one end of the central passage of said electric coil and defining a first fluid passage opening into the central passage, a first seat encircling the opening of the first passage into the central passage and carried by said first body, a second body disposed adjacent the other end of the central passage through said electric coil and defining a second fluid passage opening into the central passage, a second seat encircling the opening of the second passage into the central passage and carried by the second body, and a third fluid passage defined by the second body and opening into the central passage, a plunger formed of a ferromagnetic material, slidably received in the coil and movable between first and second positions by the magnetic field, the plunger having generally opposed first and second ends adjacent the first and second seats respectively, a first valve head carried by the plunger immediately adjacent the first end of the plunger and movable generally axially relative to the plunger between extended retracted positions relative to the first end of the plunger and yieldably biased toward its extended position, said first valve head being constructed and arranged to be yieldably displaced from its extended position when bearing on said first seat when the plunger is in its first position to close said first passage from communication with the third passage and said first valve head being disengaged and spaced from the first seat and in its extended position when the plunger is in its second position so that the first passage communicates with the third passage through the central passage, a second valve head carried by the plunger adjacent the second end of the plunger, movable between extended and retracted positions relative to the second end of the plunger and yieldably biased toward its extended position, said second valve head being constructed and arranged to be yieldably displaced from its extended position when bearing on said second seat when the plunger is in its second position to close the second fluid passage from communicating with the first and third fluid passages, and when the plunger is in its first position the second valve head is in its extended position and is disengaged and spaced from the second seat to communicate the second fluid passage with the third fluid passage through the central passage; and a flux frame formed of a ferromagnetic material and having two generally U-shape halves with end portions constructed to be mated together, disposed around the coil and constructed to engage the first body and engage the second body to retain the coil, plunger, first body and second body in assembled relationship throughout use of the solenoid valve and to at least in part provide a magnetic flux path.

2. The solenoid valve of claim 1 wherein the end portions of the two halves of the flux frame are mated together with a snap fit.

3. The solenoid valve of claim 1 wherein each generally U-shaped half has a pair of free ends, each free end is complementarily shaped and constructed to mate with a free end of the other half of the flux frame.

4. The solenoid valve of claim 3 wherein each free end has a projection and a recess each constructed to be received in a complementary recess and projection, respectively, of a free end of the other half of the flux frame.

5. The solenoid valve of claim 1 wherein the halves of the flux frame are permanently connected together.

6. The solenoid valve of claim 5 wherein the halves of the flux frame are welded together.

7. The solenoid valve of claim 5 wherein the halves are joined by an adhesive.

8. The solenoid valve of claim 1 wherein the second body has a generally circular recess and a portion of the flux frame is received in the recess to locate and retain the body.

9. The solenoid valve of claim 8 wherein the second body may be rotated relative to the flux frame to change the orientation of a connector portion of the second body relative to the flux frame.

10. The solenoid valve of claim 1 wherein each body has a circular recess and a portion of the flux frame is received in the recess of each body to locate and retain each body.

11. The solenoid valve of claim 10 wherein each body may be rotated relative to the flux frame to change the orientation of a connector portion of each body relative to the flux frame.

12. The solenoid valve of claim 1 which also comprises a pair of solder pins constructed to be connected directly to a circuit board which controls the energizing of the coil to communicate the circuit board and the coil.

13. The solenoid valve of claim 12 which also comprises a generally tubular coil bobbin on which the coil is received, and the solder pins are carried by the coil bobbin.

14. The solenoid valve of claim 13 which also comprises a second pair of solder pins carried by the coil bobbin and constructed to be connected to the circuit board to mount the solenoid valve on the circuit board.

15. The solenoid valve of claim 13 which also comprises at least one foot extending from the coil bobbin and constructed to be connected to the circuit board to mount the solenoid valve on the circuit board.

16. The solenoid valve of claim 1 which also comprises a compression spring received in the plunger and bearing on both the first valve head and the second valve head to yieldably bias each of the first and second valve heads toward its respective extended position.

* * * * *